United States Patent

Yamamoto et al.

(12) United States Patent
(10) Patent No.: US 12,429,350 B2
(45) Date of Patent: Sep. 30, 2025

(54) INFORMATION PROCESSING APPARATUS, INFORMATION PROCESSING METHOD, AND NON-TRANSITORY STORAGE MEDIUM

(71) Applicant: TOYOTA JIDOSHA KABUSHIKI KAISHA, Toyota (JP)

(72) Inventors: Shusuke Yamamoto, Tokyo (JP); Chikara Okazaki, Gotemba (JP); Kohta Watatsu, Nagoya (JP); Hideyuki Tanaka, Nisshin (JP); Shinya Murase, Nagoya (JP); Yuki Tatsumoto, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 137 days.

(21) Appl. No.: 18/377,383

(22) Filed: Oct. 6, 2023

(65) Prior Publication Data
US 2024/0175701 A1    May 30, 2024

(30) Foreign Application Priority Data
Nov. 29, 2022    (JP) ................................. 2022-190688

(51) Int. Cl.
*G01C 21/36* (2006.01)

(52) U.S. Cl.
CPC ................. *G01C 21/3691* (2013.01)

(58) Field of Classification Search
CPC ............... G01C 21/3691; G01C 21/34; G01C 21/3415; G01C 21/3461; G08G 1/096805; G08G 1/096833
See application file for complete search history.

(56) References Cited

U.S. PATENT DOCUMENTS

| 10,769,768 B1* | 9/2020 | Lee ........................ G06V 10/82 |
| 2021/0012653 A1* | 1/2021 | Yusa ..................... G08G 1/0116 |
| 2023/0360523 A1* | 11/2023 | Yusa ...................... G16H 50/70 |

FOREIGN PATENT DOCUMENTS

| JP | H10-325733 A | 12/1998 |
| JP | 2002-133585 A | 5/2002 |
| JP | 2009-069118 A | 4/2009 |
| JP | 2020-180870 A | 11/2020 |

OTHER PUBLICATIONS

English Translation JP 2002133585A (Year: 2025).*

* cited by examiner

*Primary Examiner* — Rami Khatib
(74) *Attorney, Agent, or Firm* — Oliff PLC (57) ABSTRACT

An information processing device includes a memory and a processor coupled to the memory. The processor is configured to acquire a satellite image of ground level captured by an artificial satellite, and propose a travel route to a destination based on road information related to a road on which a vehicle can travel to the destination, the road information having been determined based on the acquired satellite image.

6 Claims, 5 Drawing Sheets

INFORMATION PROCESSING APPARATUS, INFORMATION PROCESSING METHOD, AND NON-TRANSITORY STORAGE MEDIUM

CROSS-REFERENCE TO RELATED APPLICATION

This application is based on and claims priority under 35 USC 119 from Japanese Patent Application No. 2022-190688 filed on Nov. 29, 2022, the disclosure of which is incorporated by reference herein.

BACKGROUND

Technical Field

The present disclosure relates to an information processing device, an information processing method, and a non-transitory storage medium.

Related Art

For example, Japanese Patent Application Laid-Open (JP-A) No. 2020-180870 discloses a technique in which, based on real-time traffic information, the optimal detour route is used to reliably reach the destination in the shortest time or shortest distance.

Here, the technique disclosed in JP-A No. 2020-180870 determines whether or not to make a detour in accordance with real-time congestion information; however, information for accurately proposing a travel route, such as whether or not to make a detour, is insufficient.

SUMMARY

The present disclosure provides an information processing device, an information processing method, and a non-transitory storage medium that can propose a travel route to a destination from information identified from an overhead view of roads to a destination of a vehicle.

An information processing device of a first aspect includes: an acquisition unit that acquires a satellite image of ground level captured by an artificial satellite; and a proposal unit that proposes a travel route to a destination based on road information related to a road on which a vehicle can travel to the destination, the road information having been determined based on the satellite image acquired by the acquisition unit.

In the information processing device of the first aspect, the acquisition unit acquires a satellite image of ground level captured by an artificial satellite.

Then, the proposal unit proposes a travel route to the destination based on road information determined based on the satellite image acquired by the acquisition unit. This enables the information processing device to propose a travel route to the destination from road information determined from an overhead view of roads to the destination of the vehicle.

An information processing device of a second aspect is the first aspect, in which, in a case in which there are plural travel routes to the destination, the proposal unit proposes a travel route having the shortest required time to the destination from among the plural travel routes.

In the information processing device of the second aspect, in cases in which there are plural travel routes to a destination, the proposal unit proposes a travel route with the shortest required time to the destination from among the plural travel routes. This enables the information processing device to propose a travel route that requires the shortest time to a destination, from road information determined from an overhead view of roads to the destination of the vehicle.

An information processing device of a third aspect is the first aspect, in which the proposal unit presents a proposal to maintain a current travel route in a case in which it has been determined that congestion occurring on the travel route on which the vehicle is traveling is resolvable, and proposes an alternative travel route in a case in which the congestion is not resolvable.

In the information processing device of the third aspect, the proposal unit makes a proposal to maintain the current travel route in a case in which it is determined that congestion occurring on the travel route along which the vehicle is traveling can be resolved. Moreover, the proposal unit proposes another travel route in a case in which the congestion has been determined to be unresolvable. This enables the information processing device to propose a travel route in consideration of the cause of the congestion that has occurred.

An information processing device of a fourth aspect is the first aspect, in which the proposal unit, in a case in which it has been determined that there is a section of the road at which travel of the vehicle is restricted based on the road information and vehicle information related to the vehicle, proposes a travel route avoiding the section at which travel of the vehicle is restricted.

In the information processing device of the fourth aspect, the proposal unit proposes a travel route that avoids a section at which travel of the vehicle is restricted in a case in which, based on the road information and vehicle information, there is a section of the road at which travel of the vehicle is restricted. This enables the information processing device to reduce situations in which the vehicle is unable to travel along a proposed travel route.

An information processing device of a fifth aspect is the first aspect, in which the proposal unit proposes at least one of a route to the destination, or a lane for the vehicle to travel in to the destination, as a proposal for the travel route to the destination.

In the information processing device of the fifth aspect, the proposal unit proposes at least one of a route to a destination or a lane in which the vehicle travels to the destination, as a proposal for the travel route to the destination. This enables the information processing device to propose at least one of a route to the destination or a lane in which the vehicle travels to the destination, from the road information determined from an overhead view of roads to the destination of the vehicle.

As described above, the information processing device according to the present disclosure can propose a travel route to a destination from information determined from an overhead view of roads to a destination of a vehicle.

BRIEF DESCRIPTION OF THE DRAWINGS

Exemplary embodiments of the present invention will be described in detail based on the following figures, wherein.

DETAILED DESCRIPTION

Explanation follows regarding the proposal system 100 according to the present exemplary embodiment.

The proposal system 100 according to the present exemplary embodiment is a system that proposes a travel route to a destination from information identified from an overhead view of roads to a destination of a vehicle.

First Exemplary Embodiment

First, explanation follows regarding a first exemplary embodiment of the proposal system 100 according to the present exemplary embodiment.

Figure 1:
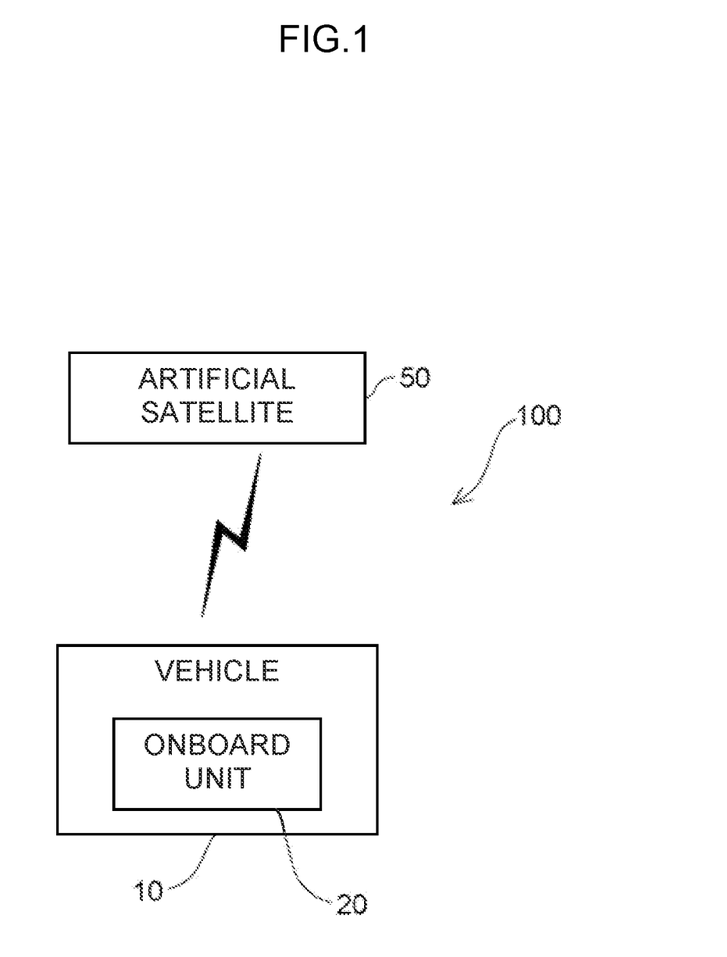
FIG. 1 is a diagram illustrating a schematic configuration of a proposal system.

FIG. 1 is a diagram illustrating a schematic configuration of the proposal system 100.

As illustrated in FIG. 1, the proposal system 100 includes a vehicle 10 and an artificial satellite 50.

Although the vehicle 10 may be any of an engine vehicle, a hybrid electric vehicle, or an electric battery vehicle, in the first exemplary embodiment, as an example, the vehicle 10 is an engine vehicle. An onboard unit 20 installed in the vehicle 10 acquires an image (hereafter also referred to as a "satellite image") captured by the artificial satellite 50, from the artificial satellite 50. Note that the satellite image may be, for example, an image in which a range from 0.5 km$^2$ to 20 km$^2$ at ground level is set as an image capture target. This ground level includes land, lakes, ponds, seas, and the like. The onboard unit 20 is an example of an information processing device.

Although FIG. 1 illustrates only one satellite 50, preferably, the artificial satellite 50 is configured by plural artificial satellites capable of capturing the same point at ground level. The number of times that the artificial satellite 50 orbits the Earth in one day, the altitude of the orbit of the artificial satellite 50, and the like are arbitrary.

Figure 2:
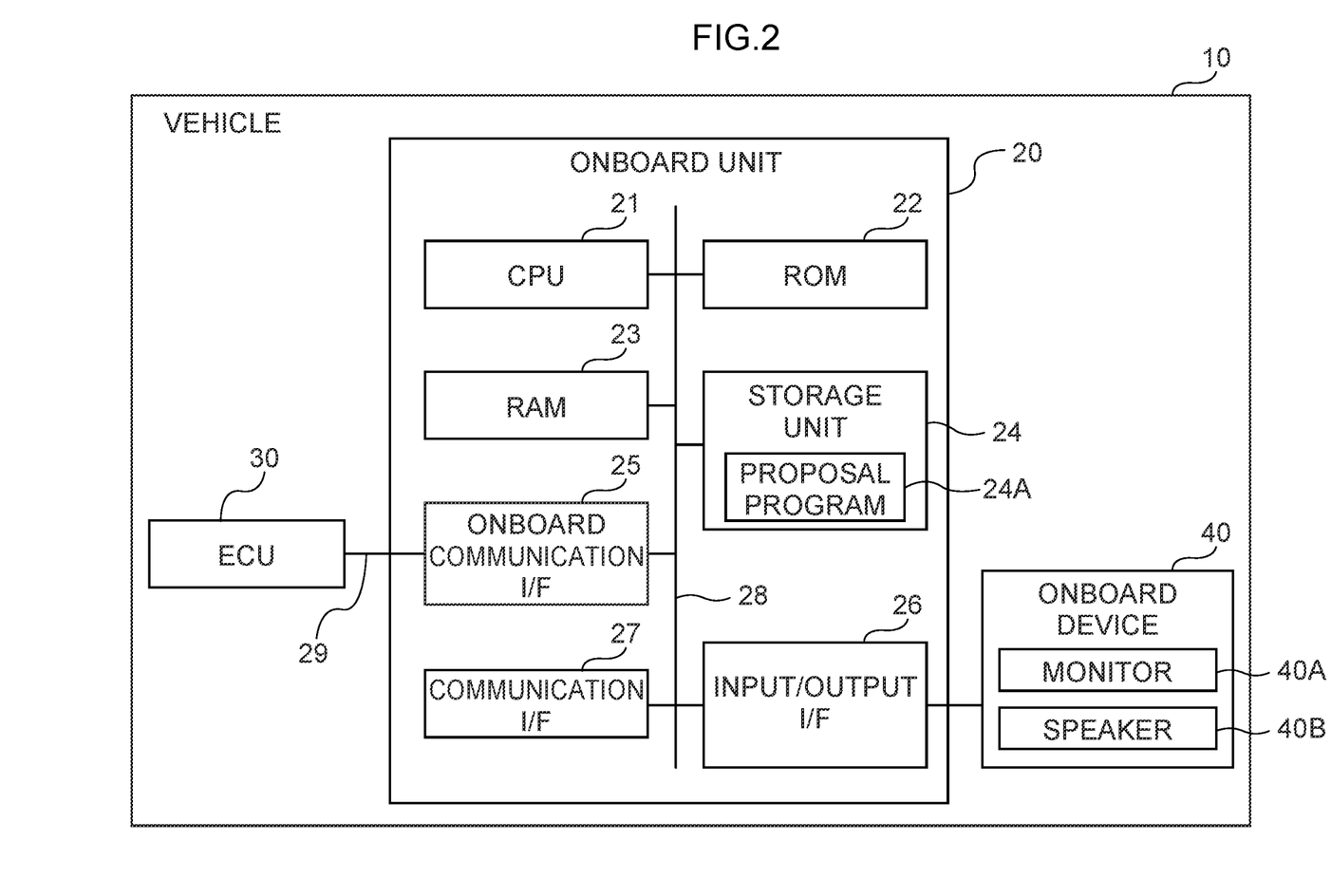
FIG. 2 is a block diagram illustrating a hardware configuration of a vehicle.

Next, explanation follows regarding a hardware configuration of the vehicle 10. FIG. 2 is a block diagram illustrating a hardware configuration of the vehicle 10.

As illustrated in FIG. 2, the vehicle 10 includes an onboard unit 20, an electronic control unit (ECU) 30 and an onboard device 40.

The onboard unit 20 is configured including a central processing unit (CPU) 21, read only memory (ROM) 22, random access memory (RAM) 23, a storage unit 24, an onboard communication interface (I/F) 25, an input/output I/F 26, and a wireless communication I/F 27. The CPU 21, the ROM 22, the RAM 23, the storage unit 24, the onboard communication I/F 25, the input/output I/F 26, and the wireless communication I/F 27 are connected so as to be capable of communicating with each other through an internal bus 28.

The CPU 21 is a central processing unit that executes various programs and controls various units. Namely, the CPU 21, serving as a processor, reads a program from the ROM 22, serving as memory, or from the storage unit 24, likewise serving as memory, and executes the program using the RAM 23 as a workspace. The CPU 21 controls the respective configurations and performs various computation processing according to a program stored in the ROM 22 or the storage unit 24.

The ROM 22 holds various programs and various data. The RAM 23 serves as a workspace to temporarily store programs and data.

The storage unit 24 is configured by a storage device such as an embedded multi-media card (eMMC) or universal flash storage (UFS), and holds various programs and various data. The storage unit 24 holds a proposal program 24A for causing the CPU 21 to execute proposal processing, described below.

The onboard communication I/F 25 is an interface for connecting to the ECU 30. A communication protocol based on the CAN protocol is used as the interface. The onboard communication I/F 25 is connected to an external bus 29. Although not illustrated in the drawings, plural ECUs 30 are provided for respective functions of the vehicle 10.

The input/output I/F 26 is an interface for communicating with the onboard device 40 installed in the vehicle 10.

The onboard device 40 is various devices installed in the vehicle 10. The vehicle 10 includes a monitor 40A and a speaker 40B as examples of the onboard device 40.

The monitor 40A is a liquid crystal monitor provided on an instrument panel, a meter panel, or the like, for displaying proposals for operation relating to the functionality of the vehicle 10, as well as images and the like relating to explanation of the functionality. The monitor 40A may be provided as a touch panel that also serves as an input function.

The speaker 40B is provided on an instrument panel, a center console, a front pillar, a dashboard, or the like, and is a device for outputting proposals for operation relating to the functionality of the vehicle 10, and audio and the like relating to explanation of the functionality. Note that the speaker 40B may be provided in the monitor 40A.

The wireless communication I/F 27 is a wireless communication module for communicating with the outside. For example, a communication standard such as 5G, LTE, Wi-Fi (registered trademark) or the like is used as the wireless communication module.

Figure 3:
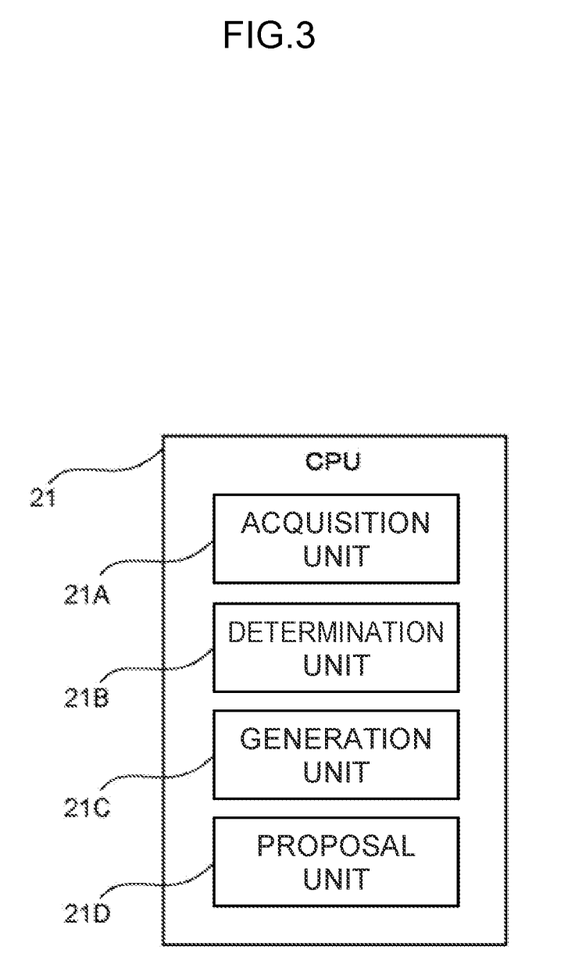
FIG. 3 is a block diagram illustrating an example of a functional configuration of a vehicle.

Next, explanation follows regarding the functional configuration of the vehicle 10. FIG. 3 is a block diagram illustrating an example of the functional configuration of the vehicle 10.

As illustrated in FIG. 3, the CPU 21 of the onboard unit 20 includes an acquisition unit 21A, a determination unit 21B, a generation unit 21C, and a proposal unit 21D as functional configuration. The respective functional configuration is implemented by the CPU 21 reading and executing the proposal program 24A stored in the storage unit 24.

The acquisition unit 21A acquires a satellite image of ground level captured by the artificial satellite 50. For example, based on the setting of a destination in a car navigation device (not illustrated) serving as the onboard device 40, the acquisition unit 21A periodically acquires satellite images from the artificial satellite 50. At this time, the acquisition unit 21A acquires, as a satellite image, an overhead view image having, as a capture target, a range at ground level from current position surroundings to destination surroundings of the vehicle 10, which is illustrated by a global positioning system (GPS) device (not illustrated) serving as the onboard device 40.

The storage unit 24 holds vehicle information relating to the vehicle 10. The vehicle information includes at least a vehicle size indicating an overall length, an overall width, and an overall height of the vehicle 10. Further, the acquisition unit 21A is able to acquire the vehicle information from the storage unit 24.

The determination unit 21B determines road information relating to a road on which the vehicle 10 can travel to a destination (hereafter referred to as a "travel road") based on the satellite image acquired by the acquisition unit 21A. The travel road is a road that exists between a current location and a destination of the vehicle 10, and includes various roads such as large streets, byroads, and the like. As an example, the determination unit 21B determines road information from the satellite image acquired by the acquisition unit 21A using known image recognition technology. As a result, the determination unit 21B determines at least one of the traffic volume, the road width, the curvature, the presence or absence of an obstacle, the presence or absence of congestion, the possibility of congestion being resolved, or the like on a travel road as road information.

Moreover, based on the road information determined above and the vehicle information acquired by the acquisition unit 21A, the determination unit 21B determines whether or not there is a section (hereafter referred to as a "restricted section") on the travel road that restricts travel of the vehicle 10. As an example, in a case in which the road width of the travel road is smaller than the full width of the vehicle 10 based on a comparison of the road width of the travel road with the full width of the vehicle 10, the determination unit 21B determines that there is a restricted section on the travel road. On the other hand, in a case in which all the road widths on the travel road are wider than the entire width of the vehicle 10, the determination unit 21B determines that there is no restricted section on the travel road.

Note that the determination unit 21B performs the determination of the road information and the determination of whether or not there is a restricted section on a travel road, prior to travel (prior to departure) of the vehicle 10. Moreover, in a case in which the vehicle 10 is traveling along a travel route to a destination designated by an occupant, the determination unit 21B performs the following determination.

In a case in which the vehicle 10 is traveling along the travel route described above, the determination unit 21B determines the presence or absence of congestion in the travel route as road information. Moreover, in a case in which the determination unit 21B has determined that congestion has occurred on the travel route, the determination unit 21B determines the possibility of the congestion being resolved as road information. For example, the determination unit 21B, using known image recognition technology, in a case in which it determines from the satellite image acquired from the acquisition unit 21A that the congestion is caused by waiting for a left turn, waiting for a right turn, or the like, determines that the congestion can be resolved quickly. On the other hand, the determination unit 21B, in a case in which it determines from the satellite image acquired from the acquisition unit 21A that the congestion is caused by an accident, construction, or the like, determines that the congestion cannot be resolved quickly. The above-described "quickly" can be understood as "within a predetermined time". The "predetermined time" in this case may be a predetermined fixed value (e.g., 5 minutes), or may be variable values (e.g., 5 minutes, 10 minutes, or 15 minutes) that vary based on an occupant instruction or control by the CPU 21.

The generation unit 21C generates a travel route to a destination based on the road information determined by the determination unit 21B. In the first exemplary embodiment, the generation unit 21C generates a route from a current position of the vehicle 10 to a destination as a travel route to the destination. At this time, in a case in which the generation unit 21C is capable of generating plural travel routes to the destination, the generation unit 21C generates plural travel routes to the destination.

Moreover, in a case in which the determination unit 21B has determined that a restricted section is present on a travel road, the generation unit 21C generates a travel route that avoids the restricted section.

The proposal unit 21D proposes a travel route to a destination—specifically, a route to the destination—generated by the generation unit 21C based on the road information determined by the determination unit 21B. As an example, the proposal unit 21D causes at least one of text or an image indicating a travel route to be displayed on the monitor 40A.

When the generation unit 21C generates plural travel routes, the proposal unit 21D proposes the travel route with the shortest required time from among the plural travel routes to the destination. In this case, the proposal unit 21D calculates the required time for each of the plural travel routes using known car navigation technology, and proposes the travel route with the shortest calculated required time.

Moreover, in a case in which the vehicle 10 is traveling along a travel route to a destination designated by an occupant, in a case in which the determination unit 21B determines that the congestion present on the travel route can be resolved quickly, a proposal to maintain the current travel route is made. In this case, the proposal unit 21D displays on the monitor 40A the text, "While there is currently congestion, since this is expected to clear imminently, let's continue on the current travel route", for example. On the other hand, in a case in which the vehicle 10 is traveling on the travel route described above, in a case in which the determination unit 21B has determined that the congestion present on the travel route will not be resolved quickly, the proposal unit 21D proposes another travel route. In this case, the proposal unit 21D displays on the monitor 40A, the text, "Since there is currently congestion, how about changing to this travel route?", for example, together with text and images indicating another travel route.

Further, in a case in which a desired travel route to a destination has been designated by an occupant, the CPU 21 of the onboard unit 20 starts road guidance based on the travel route.

Figure 4:
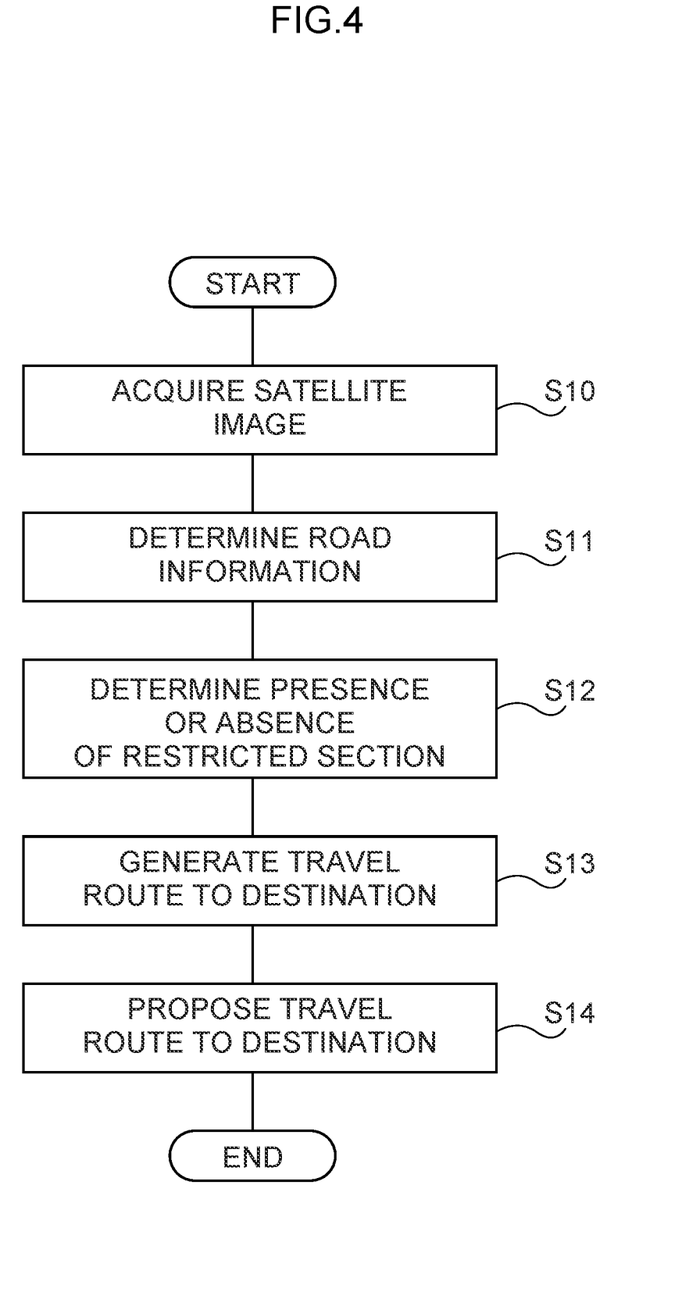
FIG. 4 is a first flowchart illustrating a flow of proposal processing.

FIG. 4 is a first flowchart illustrating a flow of proposal processing in which the onboard unit 20 proposes a travel route to a destination to an occupant. The proposal processing is performed by the CPU 21 reading from the storage unit 24 the proposal program 24A, and expanding and executing the program in the RAM 23. As an example, the proposal processing illustrated in FIG. 4 is executed based on the fact that the destination has been set in the car navigation device.

At step S10 illustrated in FIG. 4, the CPU 21 acquires a satellite image of ground level captured by the artificial satellite 50. Then, the CPU 21 proceeds to step S11.

At step S11, the CPU 21 determines road information based on the satellite image acquired at step S10. Then, the CPU 21 proceeds to step S12.

At step S12, the CPU 21 acquires vehicle information from the storage unit 24, and based on this vehicle information and the road information determined at step S11, determines whether or not there is a restricted section on a travel road. Then, the CPU 21 proceeds to step S13.

At step S13, the CPU 21 generates a travel route to a destination based on the road information determined at step S11. At this time, in a case in which the CPU 21 determines at step S12 that a restricted section is present on a travel road, the CPU 21 generates a travel route that avoids the restricted section. Then, the CPU 21 proceeds to step S14.

At step S14, the CPU 21 proposes the travel route to the destination generated at step S13. At this time, in a case in which a plurality of travel routes have been generated at step S13, the CPU 21 proposes a travel route with the shortest required time from among the plural travel routes to the destination. Then, the CPU 21 ends the proposal processing.

Figure 5:
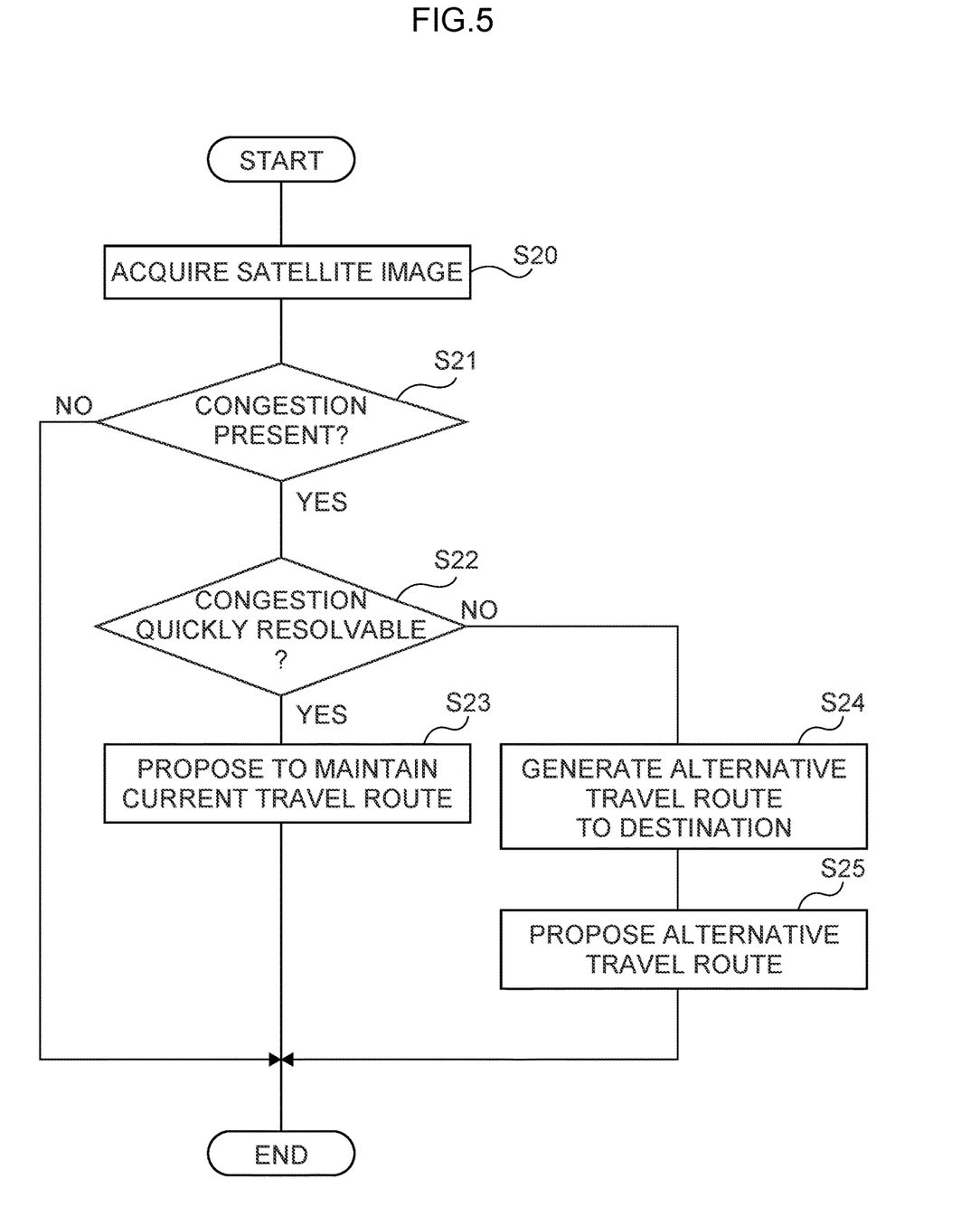
FIG. 5 is a second flowchart illustrating a flow of proposal processing.

FIG. 5 is a second flowchart illustrating a flow of proposal processing. As an example, the proposal processing illustrated in FIG. 5 is periodically executed in a case in which the vehicle 10 is traveling along a travel route to a destination designated by an occupant.

At step S20 illustrated in FIG. 5, the CPU 21 acquires a satellite image of ground level captured by the artificial satellite 50. Then, the CPU 21 proceeds to step S21.

At step S21, based on the satellite image acquired at step S20, the CPU 21 determines as road information whether or not there is a congestion on the travel route along which the vehicle 10 is traveling. In a case in which the CPU 21 determines that congestion is present on the travel route (step S21: YES), the processing proceeds to step S22. On the other hand, in cases in which the CPU 21 does not determine that congestion is present on the relevant travel route (step S21: NO), the proposal processing is ended.

At step S22, in a case in which the CPU 21 determines that the congestion on the travel route along which the vehicle 10 is traveling can be resolved quickly (step S22: YES), the processing proceeds to step S23. On the other hand, in cases in which the CPU 21 does not determine that the congestion on the travel route can be resolved quickly (step S22: NO), the processing proceeds to step S24.

At step S23, the CPU 21 proposes maintaining the current travel route. Then, the CPU 21 ends the proposal processing.

At step S24, the CPU 21 generates a travel route that is different from the current travel route using the road information determined based on the satellite image acquired at step S20. Then, the CPU 21 proceeds to step S25.

At step S25, the CPU 21 proposes another travel route to the destination generated at step S24. Then, the CPU 21 ends the proposal processing.

As described above, in the onboard unit 20 according to the first exemplary embodiment, the CPU 21 acquires a satellite image of ground level captured by the artificial satellite 50. The CPU 21 then proposes a travel route to a destination based on the road information determined based on the acquired satellite image. This enables the onboard unit 20 to propose a travel route to the destination from the road information determined from an overhead view of roads to the destination of the vehicle 10. Moreover, the CPU 21 continuously acquires satellite images captured by plural artificial satellites 50 (e.g., every second) and determines road information continuously (e.g., every second), whereby it is possible to propose a travel route while viewing a road to a destination almost in real time.

Moreover, in the onboard unit 20 according to the first exemplary embodiment, in a case in which there are plural travel routes to a destination, the CPU 21 proposes a travel route with the shortest required time to the destination among the plural travel routes. This enables the onboard unit 20 to propose a travel route that requires the shortest time to a destination, based on the road information determined from an overhead view of roads to the destination of the vehicle 10.

Moreover, in the onboard unit 20 according to the first exemplary embodiment, in a case in which the CPU 21 determines that the congestion on the travel route along which the vehicle 10 is traveling can be resolved quickly, the CPU 21 proposes maintaining the current travel route. Moreover, in cases in which the CPU 21 determines that the congestion cannot be resolved quickly, the CPU 21 proposes another travel route. This enables the onboard unit 20 to propose a travel route in consideration of the cause of the congestion that has occurred.

Moreover, in the onboard unit 20 according to the first exemplary embodiment, in a case in which a restricted section is present on a travel road, the CPU 21 proposes a travel route that avoids the restricted section. This enables the onboard unit 20 to avoid situations in which the vehicle 10 cannot travel along a proposed travel route.

Second Exemplary Embodiment

Next, explanation follows regarding a second exemplary embodiment of the proposed system 100 according to the present exemplary embodiment, while omitting or simplifying portions that overlap with the above-described exemplary embodiment.

In the second exemplary embodiment, the CPU 21 of the onboard unit 20 generates a route from a current location to a destination of the vehicle 10 as a travel route to the destination, and also generates a lane for the vehicle 10 to travel to the destination. The CPU 21 then proposes the generated route to the destination and the lane for the vehicle 10 to travel to the destination as a proposal for the travel route. For example, as a lane proposal, the CPU 21 displays on the monitor 40A at least one of text or images indicating the lane for the vehicle 10 to travel in.

With the above configuration, in the onboard unit 20 according to the second exemplary embodiment, from the road information determined from an overhead view of roads to the destination of the vehicle 10, it is possible to propose a route to the destination and a lane in which the vehicle 10 travels to the destination. For example, according to the onboard unit 20, in a case in which a travel route includes a road with plural lanes, it is possible to propose a lane in which the required time to a destination is shortest. Moreover, according to the onboard unit 20, in cases in which it has been determined that congestion has occurred near the exit of a highway included in the travel route, it is possible to propose in advance to travel in a lane that is different from the lane configuring the exit.

When proposing both a travel route to a destination and a lane in which the vehicle 10 travels to the destination, the CPU 21 may propose only a route prior to travel of the vehicle 10, and may propose to maintain or change both the route and the lane during travel of the vehicle 10.

Other Matters

Although the onboard unit 20 is an example of an information processing device in the above exemplary embodiment, there is no limitation thereto, and alternatively, another device (e.g., a server) that is capable of acquiring satellite images from the satellite 50 may be an example of an information processing device, or a combination of the onboard unit 20 and other devices may be an example of an information processing device.

In the above exemplary embodiment, in addition to the vehicle size of the vehicle 10, the vehicle information may include the occupant of the vehicle 10; specifically, driver information including a driving history, age, gender, accident history, and the like of the driver. In this case, the CPU 21 of the onboard unit 20 may determine whether or not there is a restricted section on a travel road based on the driving history, the accident history, and the like of the driver included in the vehicle information, and the road information.

Although in the above exemplary embodiment, it is determined that there is a restricted section on a travel road in a case in which the width of the travel road is smaller than the full width of the vehicle 10 based on comparison of the width of the travel road with the full width of the vehicle 10, the method of determining the restricted section is not limited to this. For example, the CPU 21 of the onboard unit 20 may determine the presence or absence of a restricted section based on the relationship between the curvature of a travel road and the vehicle size of the vehicle 10, and the presence or absence of a restricted section may be determined based on a relationship between a traffic volume on a travel road and driving skill estimated from a driving history, an accident history, and the like of the driver.

Although the CPU 21 of the onboard unit 20 calculates the required time for each of the plural travel routes in the exemplary embodiment described above, there is no limitation thereto, and alternatively, the required time for each of the plural travel routes may be calculated at the side of the satellite 50, and the onboard unit 20 may acquire the required time from the satellite 50.

Note that the proposal processing executed by the CPU 21 reading and executing software (a program) in the above exemplary embodiments may be executed by various types of processor other than a CPU. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The proposal processing may be executed by any one of these various types of processor, or by a combination of two or more of the same type or different types of processor (such as plural FPGAs, or a combination of a CPU and an FPGA). The hardware structure of these various types of processors is more specifically an electric circuit combining circuit elements such as semiconductor elements.

Although explanation has been given regarding an aspect in which the proposal program 24A is stored (installed) in advance in the storage unit 24 in the above exemplary embodiment, there is no limitation thereto. The proposal program 24A may be provided in a format stored on a non-transitory storage medium such as compact disc read only memory (CD-ROM), digital versatile disc read only memory (DVD-ROM), or universal serial bus (USB) memory. Alternatively, the proposal program 24A may be provided in a format downloadable from an external device over a network.

What is claimed is:

1. A vehicle comprising:
   at least one electronic control unit for controlling functions of the vehicle;
   an external bus;
   a car navigation device comprising a monitor and a speaker; and
   an onboard unit comprising:
      interfaces for connecting the onboard unit to the at least one electronic control unit and to the car navigation device by way of the external bus;
      a memory; and
      a processor coupled to the memory, the processor being configured to:
         based on a destination set to the car navigation device by a user, acquire a satellite image of ground level captured by an artificial satellite;
         propose, to the user in real time via the monitor of the car navigation device, a travel route to the destination based on road information related to a road on which the vehicle can travel to the destination, the road information having been determined based on the acquired satellite image; and
         upon designation of the proposed travel route by the user, start road guidance based on the travel route via the car navigation device,
      wherein the processor is further configured to:
         in a case in which the vehicle is traveling along a current travel route. determine presence or absence of congestion on the current travel route as the road information;
         in a case in which it has been determined that the congestion has occurred on the current travel route, determine a possibility of the congestion being resolved as the road information;
         in a case in which it has been determined from the satellite image that the congestion is caused by waiting for a left turn or waiting for a right turn, determine that the congestion can be resolved within a predetermined time;
         in a case in which it has been determined from the satellite image that the congestion is caused by an accident or construction, determine that the congestion cannot be resolved within the predetermined time;
         propose to maintain the current travel route as the travel route in a case in which it has been determined that the congestion occurring on the current travel route is resolvable within the predetermined time; and
         propose an alternative travel route as the travel route in a case in which it has been determined that the congestion is not resolvable within the predetermined time.

2. The information processing device according to claim 1, wherein the processor is configured to, in a case in which there is a plurality of possible travel routes to the destination, propose, as the travel route, a possible travel route having a shortest required time to the destination from among the plurality of possible travel routes.

3. The information processing device according to claim 1, wherein the processor is further configured to;
   determine a presence or absence of a restricted section on the travel road based on a relationship between a traffic volume on the travel road, which is included in the road information, and driving skill estimated from a driving history or an accident history of the user, the restricted section being a section on the travel road that restricts travel of the vehicle;
   determine, prior to travel of the vehicle, the road information and whether or not there is the restricted section on the travel road;; and
   in a case in which it has been determined that there is the restricted section, propose, as the travel route, a travel route avoiding the section at which travel of the vehicle is restricted.

4. The information processing device according to claim 1, wherein the processor is configured to propose at least one of a route to the destination or a lane for the vehicle to travel in to the destination, as a proposal for the travel route to the destination.

5. An information processing method executed by a processor of an onboard unit of a vehicle, the vehicle comprising:
- at least one electronic control unit for controlling functions of the vehicle;
- an external bus;
- a car navigation device comprising a monitor and a speaker; and
- the onboard unit, which comprises:
  - interfaces for connecting the onboard unit to the at least one electronic control unit and to the car navigation device by way of the external bus;
  - a memory; and
  - the processor, which is coupled to the memory, and the method comprising, by the processor:
- based on a destination set to the car navigation device by a user, acquiring a satellite image of ground level captured by an artificial satellite;
- proposing, to the user in real time via the monitor of the car navigation device, a travel route to the destination based on route information related to a road on which the vehicle can travel to the destination, the road having been determined based on the acquired satellite image; and
- upon designation of the proposed travel route by the user, starting road guidance based on the travel route via the car navigation device, wherein the method further comprises, by the processor:
- in a case in which the vehicle is traveling along a current travel route, determining presence or absence of congestion on the current travel route as the road information;
- in a case in which it has been determined that the congestion has occurred on the current travel route, determining a possibility of the congestion being resolved as the road information;
- in a case in which it has been determined from the satellite image that the congestion is caused by waiting for a left turn or waiting for a right turn, determining that the congestion can be resolved within a predetermined time;
- in a case in which it has been determined from the satellite image that the congestion is caused by an accident or construction, determining that the congestion cannot be resolved within the predetermined time;
- proposing to maintain the current travel route as the travel route in a case in which it has been determined that the congestion occurring on the current travel route is resolvable within the predetermined time; and
- proposing an alternative travel route as the travel route in a case in which it has been determined that the congestion is not resolvable within the predetermined time.

6. A non-transitory storage medium storing an information processing program executable by a processor of an onboard unit of a vehicle to perform processing, the vehicle comprising:
- at least one electronic control unit for controlling functions of the vehicle;
- an external bus;
- a car navigation device comprising a monitor and a speaker; and
- the onboard unit, which comprises:
  - interfaces for connecting the onboard unit to the at least one electronic control unit and to the car navigation device by way of the external bus; and
  - the processor, and the processing comprising:
- based on a destination set to the car navigation device by a user, acquiring a satellite image of ground level captured by an artificial satellite;
- proposing, to the user in real time via the monitor of the car navigation device, a travel route to the destination based on route information related to a road on which the vehicle can travel to the destination, the road having been determined based on the acquired satellite image; and
- upon designation of the proposed travel route by the user, starting road guidance based on the travel route via the car navigation device, wherein the processing further comprises:
- in a case in which the vehicle is traveling along a current travel route, determining presence or absence of congestion on the current travel route as the road information;
- in a case in which it has been determined that the congestion has occurred on the current travel route, determining a possibility of the congestion being resolved as the road information;
- in a case in which it has been determined from the satellite image that the congestion is caused by waiting for a left turn or waiting for a right turn, determining that the congestion can be resolved within a predetermined time;
- in a case in which it has been determined from the satellite image that the congestion is caused by an accident or construction, determining that the congestion cannot be resolved within the predetermined time;
- proposing to maintain the current travel route as the travel route in a case in which it has been determined that the congestion occurring on the current travel route is resolvable within the predetermined time; and
- proposing an alternative travel route as the travel route in a case in which it has been determined that the congestion is not resolvable within the predetermined time.

* * * * *